US007377785B2

(12) United States Patent
Ullman et al.

(10) Patent No.: US 7,377,785 B2
(45) Date of Patent: May 27, 2008

(54) SYSTEM AND METHOD FOR GENERATING AND PROVIDING EDUCATIONAL EXERCISES

(75) Inventors: Jeffrey D. Ullman, Stanford, CA (US); Ramana V. Yerneni, Cupertino, CA (US)

(73) Assignee: Gradiance Corporation, Stanford, CA (US)

( * ) Notice: Subject to any disclaimer, the term of this patent is extended or adjusted under 35 U.S.C. 154(b) by 171 days.

(21) Appl. No.: 10/851,920

(22) Filed: May 21, 2004

(65) Prior Publication Data

US 2004/0234936 A1   Nov. 25, 2004

Related U.S. Application Data

(60) Provisional application No. 60/472,616, filed on May 22, 2003.

(51) Int. Cl.
*G09B 7/00* (2006.01)
(52) U.S. Cl. ............................. 434/323; 434/350
(58) Field of Classification Search ............. 434/322, 434/323, 324, 350, 118
See application file for complete search history.

(56) References Cited

U.S. PATENT DOCUMENTS 6,064,856 A * 5/2000 Lee et al. ............. 434/350

6,431,875 B1 * 8/2002 Elliott et al. ............. 434/322

OTHER PUBLICATIONS

Ullman, J.D., "Improving the Efficiency of Database-System Teaching", *SIGMOD*, 2003, 3 pages.
Ullman, J.D., "OTC(On-Line Testing Center) Users' Manual", Department of Computer Science-Stanford University, 1-11.

* cited by examiner

*Primary Examiner*—Robert Pezzuto
*Assistant Examiner*—Kesha Y. Frisby
(74) *Attorney, Agent, or Firm*—Peter M. Ullman LLC

(57) ABSTRACT

A system and method for generating and administering classroom exercises to a student. One or more root questions is generated, where each root question has a stem, a plurality of right answers, and a plurality of wrong answers. A multiple-choice question instance is created by combining the stem with a set of answer choices that are created from one of the right answers and one or more of the wrong answers. The questions are administered to a student. Preferably, the sets of questions based on the same root questions are administered one or more times to the student—e.g., a student may be required to work three sets of question instances based on the same set of root questions, or may be required to continue working new sets of question instances until all of the questions in one set are answered correctly.

30 Claims, 4 Drawing Sheets

SYSTEM AND METHOD FOR GENERATING AND PROVIDING EDUCATIONAL EXERCISES

CROSS-REFERENCE TO RELATED CASES

This application claims the benefit of U.S. Provisional Application No. 60/472,616, entitled "Improving the Efficiency of Database-System Teaching," filed on May 22, 2003.

FIELD OF THE INVENTION

The present invention relates generally to the field of computer-assisted education. More particularly, the invention provides systems and methods for assisting in the teaching of a subject to a student by the use of computer-generated exercises.

BACKGROUND OF THE INVENTION

The cost of education has risen, relative to inflation, faster than almost any other industry. For example, in the past 45 years, tuition at major colleges, relative to the cost of sending a letter across the United States by air, has increased fivefold. It has increased 500 times relative to the cost of a cross-country phone call. Computerization has had little effect on this cost. There are some on-line courses to take, and there are some activities in the corporate-retraining arena. But nothing yet has reduced significantly the cost of college education.

While computers have generally found their way into a wide field of endeavors—with the result being nearly universal cost-reduction—the use of computers in education has some limits. Residential college education cannot be replaced entirely by impersonal, on-line courses. The social aspects of college, including learning in groups, informal teacher-student discussions, and so on, are too valuable and important. Savings, therefore, must come from elimination of redundancy. At any time, there are hundreds of courses in a given subject matter (e.g., database systems, differential equations, conversational French) that are being offered at the numerous colleges in the United States (or in the rest of the world). They differ mainly in small ways. For instance, they have similar, yet distinct, homework assignments, each requiring substantial time to design, debug, and grade.

Generating and grading homework assignments is a task that can be automated. Individualized help, group discussions, and other aspects of a course that require personal attention of an instructor cannot be easily automated. By automating those tasks that can be replicated efficiently, the course staff is free to do the tasks that cannot easily be automated, and efficiency is achieved.

Certain types of automated systems for generating and/or grading assignments exist. Electronic grading of multiple-choice problems has existed for years. However, such systems suffer from the problem that the questions are entirely generated by human effort, so, to avoid the enormous effort of creating individual questions for each student, all students are generally given the same set of questions, which raises the possibility of answer sharing.

In view of the foregoing, there is a need for a system that overcomes the drawbacks of the prior art.

SUMMARY OF THE INVENTION

The present invention provides systems and methods for teaching a subject to a student by use of computer-generated exercises. Source information is provided from which questions may be generated. The source information is used to generate questions for the student to answer, where the questions sample the student's knowledge of the subject being taught More specifically, knowledge of the answer to one particular problem that can be solved using the subject being taught. One or more sets of the questions may be presented to the student for the student to answer. The student's performance on the questions is evaluated. Preferably, if the student's performance on a set of questions does not meet a defined standard, then new sets of questions based on the same source information may be repeatedly administered to the student, until the student's performance does meet a standard. (Alternatively, the system may administer an arbitrary number of sets of questions to the student, irrespective of the student's performance on previous sets of questions.) Because a vast number of questions can be generated automatically based on the source information, it is possible to ask a student to work an underlying problem and answer questions about it repeatedly, without incurring the problems that inhere in repeatedly giving the student the exact same set of questions, and without incurring the additional human labor required to generate a large number of different new questions.

In a preferred embodiment, the questions to be administered to the student are multiple-choice questions. In this case, the source information may comprise a question stem, a set of right answers, and a set of wrong answers, and the system may generate questions by combining the stem, one right answer, and one or more wrong answers, to produce a multiple-choice question. The source information may be generated by a class instructor, or may be provided in the form of prepackaged information that is commercially distributed as a teaching tool. In greater generality, the source information may comprise any type of template for a question, and it will be appreciated that the combination of a stem, right answers, and wrong answers that form the building blocks for multiple-choice questions is merely one embodiment of the above-mentioned source information.

Optionally, answer explanations may be provided with the answer choices—especially the wrong answer choices—which can be displayed to the student after the student answers the questions in order to assist the student in learning the subject matter. These answer explanations can be generated by the class instructor, or can be included with prepackaged questions.

In a preferred embodiment, the student is asked to answer all questions in a set correctly, and is given new sets of similar questions (i.e., new question instances based on the same underlying source information) to answer until the student answers all questions in a single set correctly. Preferably, there a limit is imposed as to the number of, and/or frequency with which, a student may take a set of questions.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF THE INVENTION

The present invention provides systems and methods for generating and administering a classroom exercise. A root question constitutes source information from which questions for the exercise may be derived. A set of one or more question instances derived from the root question(s) is administered to the student, and the student's performance on the question instances is evaluated. Optionally, plural sets of question instances may be administered to the student, or sets of question instances may be recurrently administered to the student until the student's performance meets a defined standard.

Mechanisms are derived below for implementing the above-described system, and certain variations thereon.

Derivation of Questions from Source Information

Figure 1:
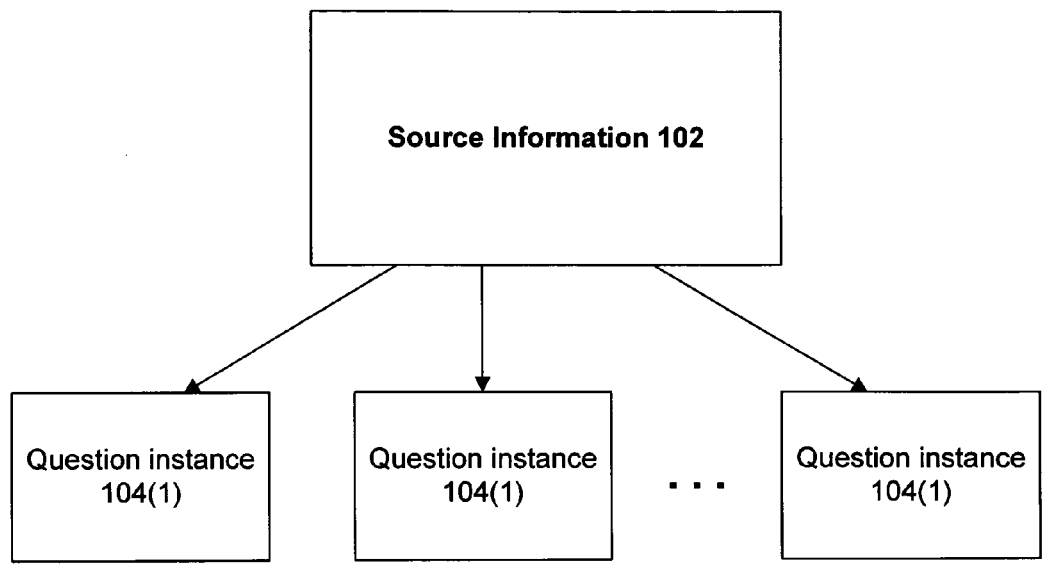
FIG. 1 is a block diagram of source information, and the derivation of exercise questions therefrom, in accordance with aspects of the invention.

FIG. 1 is a block diagram showing how questions, which are to be administered to a student, may be derived from an underlying set of source information. Source information 102 constitutes some type of template, or other general information, from which individual question instances 104(1), 104(2), . . . , 104(n) may be derived.

The invention is not limited to any particular form of source information 102 or questions 104(1) through 104(n), although a preferred embodiment of source information 102 is described below in connection with FIG. 2. In one example, source information 102 may comprise a problem template from which a large number of specific question instances can be derived—e.g., source information 102 may comprise the general question template: "Compute the number of square yards of carpet needed to cover a rectangular room whose length is $x feet and whose width is $y feet." In this case, a large number of questions can be created from this type of source information 102 by substituting different values for $x and $y. In this example, source information 102 may also include the logic needed to compute the answer (e.g., the logic needed to compute the value $x times $y divided by nine), so that a student's answer to the question can be evaluated. Thus, an example of a question instance derived from this source information is "Compute the number of square yards of carpet needed to cover a rectangular room whose length is 9 feet and whose width is 3 feet." The formula for deriving a question instance from source information 102 (e.g., randomly select two real numbers and substitute them for the variables $x and $y) is an example of a "rule."

As another example, source information 102 may comprise the question template: "What is the capital of $state?" This example of source information 102 would also comprise a list of states that could be substituted for the variable $state. Thus, based on this source information 102, a derived question instance could be "What is the capital of Alaska?" (In this case, the "rule" for deriving question instances from source information 102 would require that one of the listed states be substituted for the variable $state.) Moreover, since there is no mathematical logic that can be used to compute the name of a capital from the name of a state, source information 102 would also include information that correlates each state with its capital, so that a student's answer to any derived question instance could be evaluated.

In a preferred embodiment, source information 102 comprises information from which multiple-choice questions can be derived. Although the invention is not limited to systems that use multiple-choice questions, it should be noted that multiple-choice questions are advantageous in systems that automate the generation and grading of questions, because they can be derived according to a simple formula or "rule" (e.g., generate a question instance with one correct choice and three incorrect choices), and answers thereto can be evaluated unambiguously (i.e., the student's answer of choice "A" is unambiguous, whereas answers to the state capital question described above could have ambiguities due to misspelling, capitalization, abbreviation, etc.). Thus, in the case of multiple-choice questions, source information 102 could take the form shown in FIG. 2.

Figure 2:
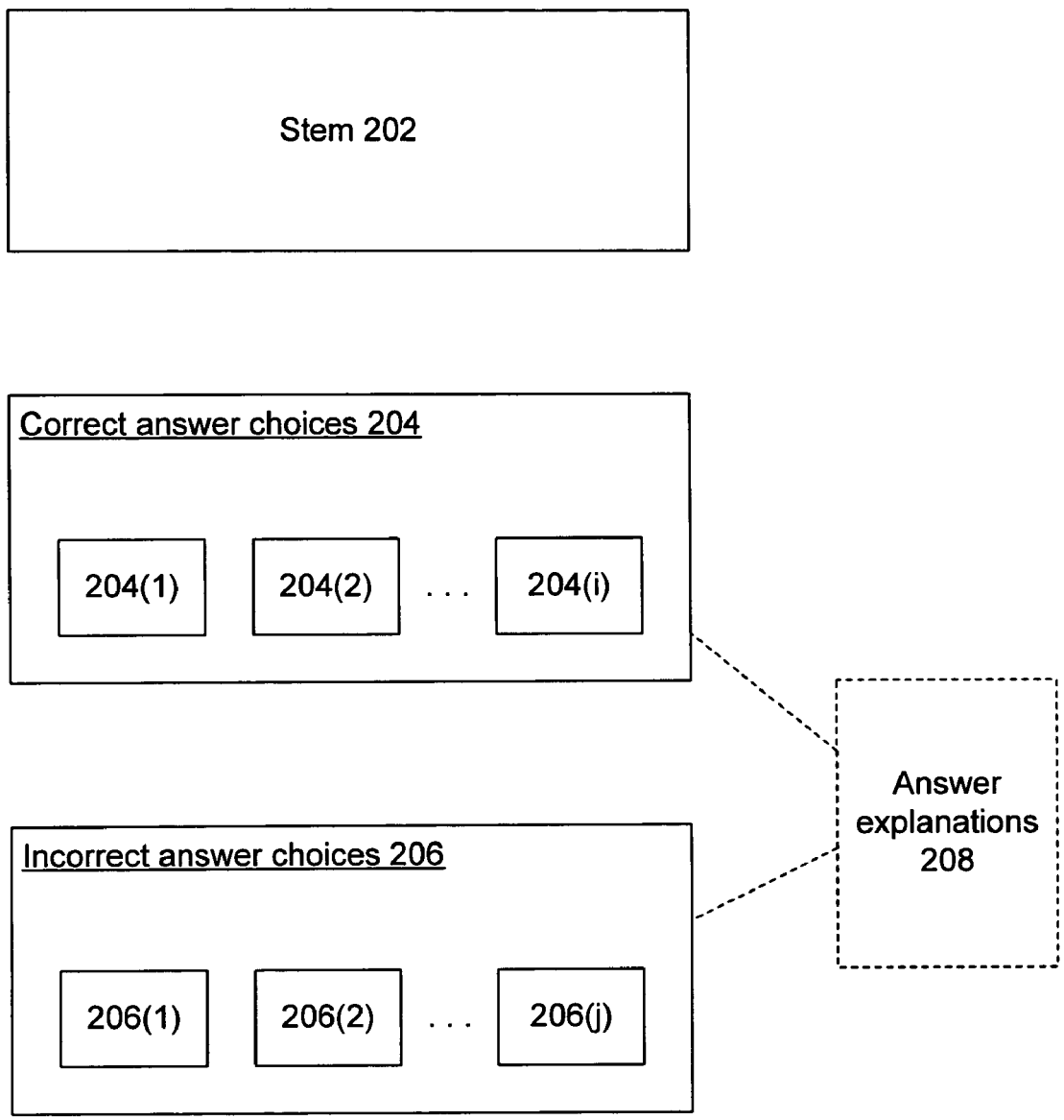
FIG. 2 is a block diagram of an example type of source information from which exercise questions can be derived.

In the example of FIG. 2 source information 102 comprises the building blocks from which multiple-choice questions may be derived. Thus, source information 102 comprises a stem 202, a set of correct answer choices 204, and a set of incorrect answer choices 206. As is known in the relevant art, the "stem" of a multiple-choice question is the preamble that sets up the problem and asks the student to pick the correct answer from a set of possible answers; a correct answer choice is a legitimate answer to the question posed by the stem; and an incorrect answer choice is an answer that does not answer correctly the question posed by the stem. Thus, an example of a multiple choice question is:

1. Which of the following cities is a state capital in the United States?
   A. Jacksonville, Fla.
   B. Tacoma, Wash.
   C. Pierre, S.Dak.
   D. Eugene, Oreg.

In this example, "Which of the following cities is a state capital in the United States?" is the stem 202; "Pierre, S.Dak." is an example of a correct answer choice 204; and "Jacksonville, Fla.," "Tacoma, Wash.," and "Eugene, Oreg." are examples of incorrect answer choices 206. The entire question—i.e., stem, correct and incorrect answer choices, and letters before the answer choices—is an example of a "question instance" that can be derived from the source information.

Preferably, answer choices 206 comprise a plurality of possible correct answers 204(1), 204(2), . . . 204(i) that could be used in multiple-choice questions. Thus, in the state-capital example answer choices 206 could include fifty correct answer choices (Montgomery, Ala.; Juneau, Ark.; Phoenix, Ariz.; . . . ; Cheyenne, Wyo.). If the lesson to which the question relates is on the capitals of the fifty states, this type of source information 102 is sufficient to generate questions that will sample the student's knowledge of the entire lesson. Similarly, there is preferably a plurality of incorrect answer choices 206(1), 206(2), . . . , 206(j). Since a question instance typically has two to four incorrect answer choices for every correct one, source information

102 preferably includes more incorrect answer choices 206 than correct answer choices 204, although this is not a requirement. Generating good multiple choice questions merely requires a set of plausible incorrect choices that is large enough to keep their recurrence small over a reasonably-sized sample of question instances (since a high rate of recurrence could help a student to identify incorrect choices without learning the underlying material simply by remembering which answer choices have previously appeared).

Source information of the type depicted in FIG. 2, from which a multiple-choice question may be derived, may be referred to herein as a "root question." In general, a root question is a multiple-choice question that has several right answers and many wrong answers.

In a preferred embodiment, source information 102 may, optionally, include explanations 208 of the answer choices, which can be presented to the student as a learning tool after he or she has answered the question (or after he or she has answered all of the questions in a set of questions). For example, the answer choice "Tacoma, Wash." may be associated with an explanation such as "Tacoma is a city in Washington, but is not the capital of that state. The capital of Washington is Olympia." Thus, if a student had chosen "A" as the answer to the above question, he or she could be presented with this explanation of the wrong answer, which could assist in the student's learning of the material. Correct answer choices can also be associated with explanations 208 (e.g., "Correct. Pierre is the capital city of South Dakota."), although, depending on the nature of the material, the correct answer choices may be more self-explanatory than the incorrect answer choices, and an explanation of the correct answers may be less relevant than an explanation of the incorrect answers.

While state capitals provide a convenient example of a root question, the techniques of the present invention can also be applied to more complex subject matter, such as college-level science or engineering. For example, in a course on database systems, a typical homework question posed to a class may present two (or more) relations (e.g., $R_1$ and $R_2$), and then may ask the student to perform some operation on the relations such as: "Calculate the natural join of $R_1$ and $R_2$". Conventionally, a homework assignment would ask the student to write the relation that is the natural join of $R_1$ and $R_2$, and the answer would be graded by a human teaching assistant. However, a root question can be constructed for this type of problem that effectively requires the student to compute the natural join of $R_1$ and $R_2$, but is much easier to grade. For example, an instructor (or some other root question writer) can generate a root question with the following stem: "Which of the following tuples is in the natural join of $R_1$ and $R_2$?" Correct answer choices would then be tuples that are actually members of the natural join of $R_1$ and $R_2$, and incorrect answer choices can comprise tuples that are not in the join. Preferably, the incorrect answers can be constructed in a manner that reflects common errors that students make when calculating joins. If the incorrect answer choices are skillfully constructed, then for a student to reliably answer the question correctly should effectively require the student to compute the join in order to determine which tuples are members, thereby providing a similar incentive for the student to work the underlying problem as there would be if the problem had been presented in a long-answer form. In a preferred embodiment, the student could be asked a set of plural questions relating to the same underlying facts (e.g., three separate questions, each of which asks a student to identify a tuple that is in the join), and his or her performance could be evaluated under a standard that requires the student to get all the questions correct. Thus, it is unlikely that a student would be able to get all of the answers right by guessing and without understanding the underlying problem, so—in terms of teaching the subject matter and ensuring that the student understands the problem—such a set of multiple-choice questions approaches the reliability of a long answer problem, but with a greatly reduced grading cost.

Example System for Administering Questions

Figure 3:
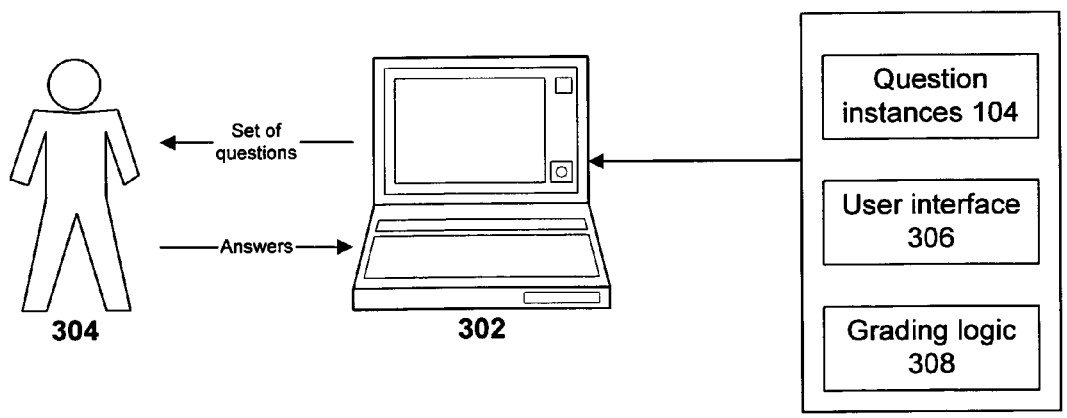
FIG. 3 is a block diagram of a system that presents exercise questions to a student in accordance with aspects of the invention.

FIG. 3 shows an example system that administers exercise questions. Exercise questions are preferably administered to a student using a general purpose computer 302. The components and capabilities of a general-purpose computer are generally known in the art, and thus are not described in detail herein.

Computer 302 is loaded with various types of data and software: question instances 104, a program that implements a user interface 306 for presenting the question instances to the student, and grading logic 308 that evaluates the students answers and preferably determines whether the student's performance on the question instances meets the applicable standards (e.g., complete correctness on a set of questions, etc.). Question instances 104 may have been pre-derived from source information 102 (shown in FIGS. 1 and 2) and then pre-loaded onto the computer 302 that student 304 uses. Alternatively, computer 302 may be loaded with source information 102 itself, together with logic that derives question instances 104 from the source information. It will be appreciated that there are various ways to cause question instances 104 to exist on computer 302 at the time that question instances 104 are administered to student 304 (e.g., stand-alone workstation that contains all logic and data needed to derive the question instances, client-server architecture where the server generates the question instances and delivers the question instances to computer 302 for administration to the student, web server that delivers content to a browser at the student workstation, etc.), and the invention is not limited to any particular architecture or design.

Student 304 uses computer 302 to answer a set of questions. User interface logic 306 causes computer 302 to present question instances 104 (or some subset thereof) to student 304. Student 304, in turn, provides answers to these question instances. Grading logic 308 determines whether student 304's answers to the question instances are correct or incorrect, and, preferably, evaluates the student's overall performance on a set of question instances. Computer 302 may optionally be loaded with a program and/or data that provides answer explanations to the students (preferably only explanations for those questions that the student got wrong), as more particularly described above.

Example Process(es) for Creating and Administering Questions

Figure 4:
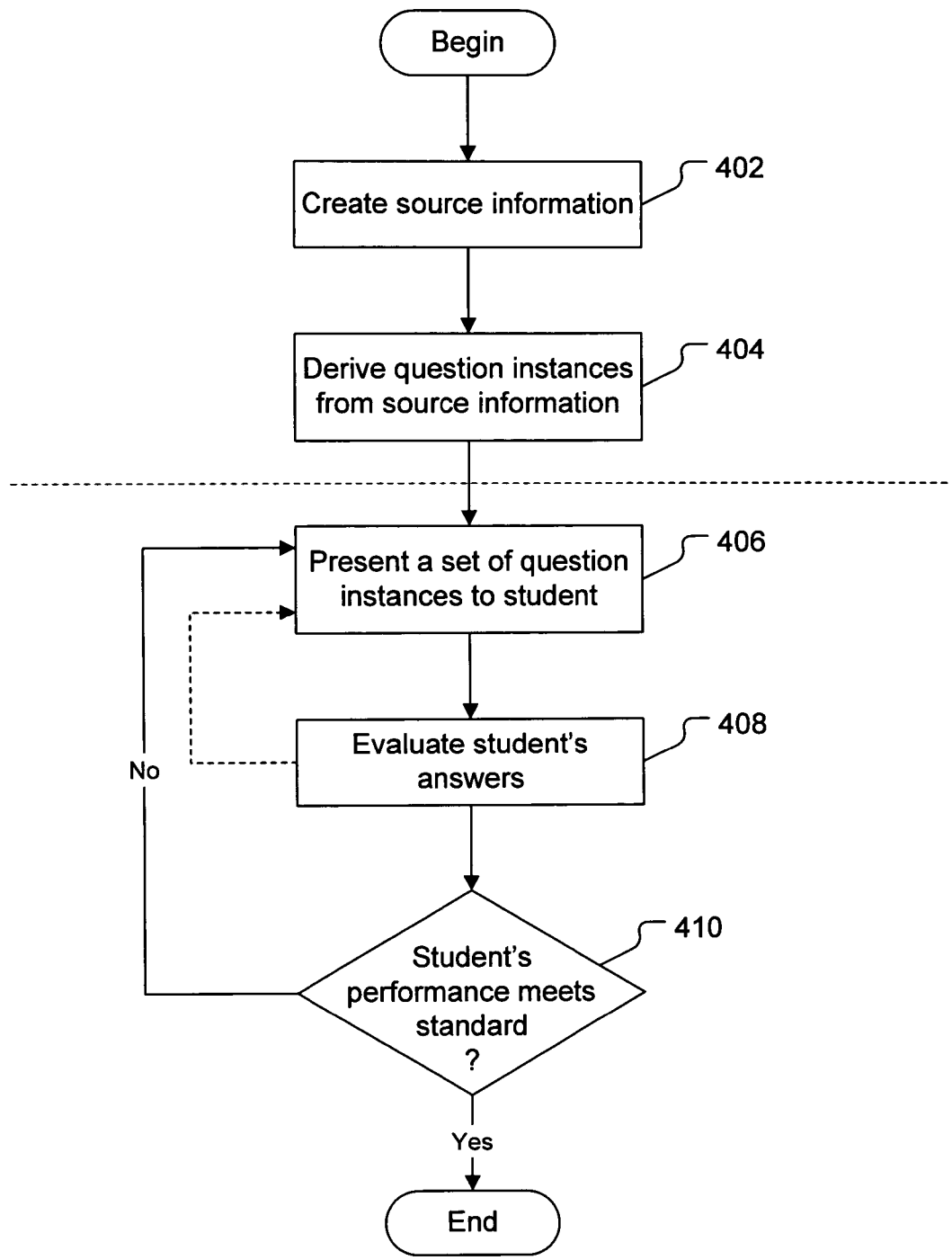
FIG. 4 is a flow diagram of an example process for generate and administering a teaching exercise in accordance with aspects of the invention.

FIG. 4 is a flow diagram showing an example process for generating and administering questions in accordance with aspects of the invention.

Initially, source information (e.g., a root question) is created (402), from which one or more question instances may be derived. Depending on the nature of the exercise(s) to be administered, plural sets of source information may be created. For example, in the non-limiting case where the exercise is used as part of a database systems course, an exercise may comprise a set of questions on various aspects of database systems (e.g., binary operations, query language syntax, etc.), and different root questions (or other source information) may be used to create question instances on these different aspects. Thus, there would be one set of source information that asks (in the stem) for a student to identify tuples that are in the natural join of two relations, along with sets of correct and incorrect answer choices for that problem. Another set of source information might contain a stem that asks a student to identify a syntactically correct query in SQL, and would contain different sets of correct and incorrect answer choices appropriate for that stem. There is no limit to the number of different sets of source information that may be created.

After the source information has been created, question instances are derived from the source information (404). As described above, the manner in which a question instance is derived from source information depends on the nature of the source information itself. In the case of multiple-choice questions that are derived from root questions, the nature of the derivation is more particularly described above in connection with FIG. 2.

Once one or more question instances have been derived, the question instances may be presented to a student (406). The student interacts with a computer to read and answer the question instances, and the student provides his or her answers to the computer that is being used to administer the questions. The student's answers are then evaluated (406) to determine whether the answers are right or wrong, and, optionally, to determine whether the student's overall performance on a set of questions meets a defined standard. In one embodiment, the student may be asked to complete plural sets of questions, in which case the process returns to 406 to present a new set of questions to the student, and this process repeats until the number of sets of questions that the student is to answer has been reached.

If the student's performance is being evaluated to determine whether that performance meets a defined standard (e.g., whether the student answers all question instances in a set correctly), then it is determined (410) whether the student's performance meets that standard. As noted above, an exercise may comprise the administration of plural sets of questions to the student without regard to the student's performance on any given set (e.g., a homework assignment may require the student to work three sets of questions). In one variation, however, the student is asked to repeatedly take new sets of question instances (based on different sets of questions derived from the source information) until the student's performance on an entire set meets the defined standard. If the questions are being administered in this way, then a determination at 410 that the student has met the standard may constitute the end of the student's exercise, while failure to meet the standard returns the process to 406 to present a new set of questions instances (possibly preceded by choice explanations for the student's incorrect answers on the last set of questions), and this cycle of administering questions and evaluating the student's performance under the standard may be repeated until the student does meet the standard.

In the case where the repetition of sets of questions is based on the student's performance on prior sets, the process of FIG. 4 optionally may impose limits on the repeated taking of sets of questions by a student. For example, the student may be limited to taking the exercise n times, may be limited to taking the exercise n times per day, or may be required to wait a minimum amount of time before retaking an exercise.

The dotted line in FIG. 4 represents a division between the acts that generate question instances and the acts that administer question instances to a student. Typically, an instructor will perform the acts above the line, and a student will perform and/or participate in acts below the line.

Typically, these sets of acts will take place on different machines (e.g., the instructor's machine and the student's machine). However, it should be noted that the invention is not limited to any particular architectural, physical, or temporal distribution of the acts shown in FIG. 4. For example, blocks 402 and 404 may occur at a commercial question provider who is in the business of providing root questions and software to administer them. In another example, the commercial question provider generates the source information at block 402, but the derivation of questions is performed either at a local instructor's machine or at the student's machine. In another example, the generation of source information may be performed by a class instructor, and the derivation of questions from that source information may be performed either at the instructor's machine or at the student's machine. There is no limit to the way in which the different acts depicted in FIG. 4 may be distributed.

Example Exercise Scenario

The following in an example scenario in which the techniques and mechanisms described herein may be used for a class exercise:

1. An assignment consisting of several questions is assigned to the class. Each student in the class is allowed to take the assignment as many times as they wish, and only a student's last score counts. Thus, there is an incentive for each student to answer sets of questions until he or she scores 100% on the assignment. In a preferred embodiment, an assignment includes 4-5 questions. Too few questions allow a student to guess randomly and eventually get a perfect score; too many questions create too much risk that the student will accidentally answer a question incorrectly and will have to start over again.

2. A student opens the assignment the first time. The software that administers the assignment gives the student the questions in random order (to make it harder for students to share information about, e.g., "question number 3"). The system also chooses at random one correct answer and three wrong answers, and presents those in random order. The student may be able to answer all of the questions, but, more likely, he or she will have trouble with one or more, so they do the best they can and submit their answers.

3. The student studies the material needed to answer the questions with which he or she is having trouble, off-line. For example, if the student doesn't know how to compute a join, the student could reread the material on that topic, attend office hours, or send an E-mail to a human teaching assistant. The student can then compute the entire join, as if the question had been the long-answer problem "compute this join."

4. The student opens the assignment a second time, this time prepared with the answers to the general questions for which they will receive new, random instances. For example, if the student has correctly computed the join of $R_1$ and $R_2$, then the student should be able to identify that tuple from among the plural answer choices.

Example Product Incorporating Programs/Data for Using Exercise Questions

Figure 5:
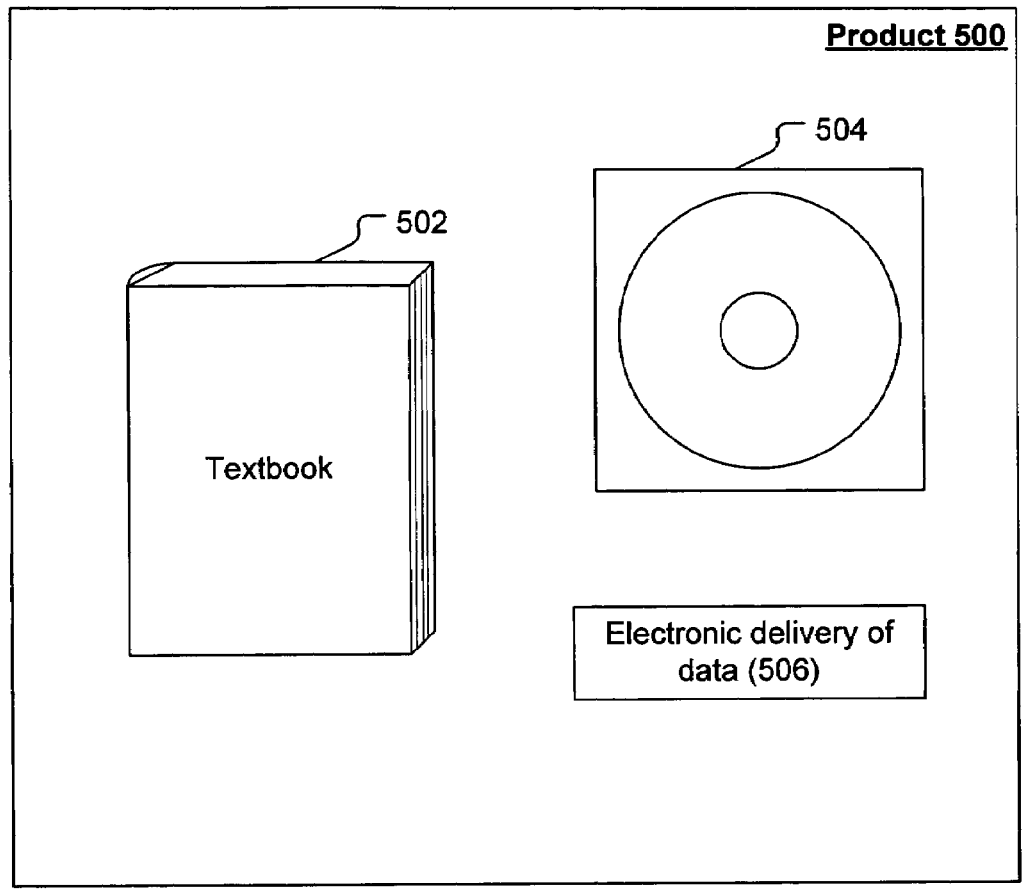
FIG. 5 is an example product in which aspects of the invention may be embodied.

FIG. 5 shows an example product that may embody some or all of the features of the invention. Product 500 comprises a teaching tool (which is depicted herein as textbook 502), and also includes data and/or programs that can be used to administer exercise questions relating to the subject matter of the teaching tool. (These data and programs are depicted, by way of example and not limitation, as a computer-readable medium 504 (e.g., CD-ROM), or an electronic download 506.) The data and/or programs may include source information (e.g., root questions) from which question instances may be derived and administered together with the software necessary to administer the questions; or, the data/programs may include pre-derived question instances that are based on source information together with the necessary administration software; or, the data/programs may include software that allows an instructor to create root questions and derive questions instances therefrom, and to administer those exercises based on the question instances to students. The programs/data included in product 500 may incorporate any of the techniques, systems, or methods described above.

In one example embodiment, a distributor of educational materials may package a teaching tool (e.g., textbook) together with data/programs for administering classroom exercises based on the subject matter of the textbook. For example, a textbook may come with a CD-ROM affixed thereto, or may come with a token that permits download of the necessary programs/data over the Internet.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of teaching a subject matter comprising:
   providing a problem to a student;
   asking said student to compute a solution to said problem; wherein said solution is not graded;
   administering a first set of one or more question instances to a student, said first set of one or more question instances being based on: (1) source information that relates to the subject matter, said source information comprising a correct solution to said problem and (2) one or more rules that govern derivation of question instances from said source information, wherein said question instances are derived from said correct solution; wherein each question in said question instances is a multiple-choice question;
   evaluating said student's performance on said first set of one or more question instances; and
   if said student's performance on said first set of one or more question instances does not meet a standard, then repeating said administering and evaluating acts until said student's performance meets said standard or repeating said administering and evaluating acts exceeds a limit, wherein each repetition of said administering and evaluating steps is performed with a new set of question instances that is different from said first set of question instances and different from any new set of question instances that has already been administered to said student, and wherein each new set of question instances is based on: (1) said source information and (2) said one or more rules.

2. The method of claim 1, wherein said source information comprises a stem, a set of correct answers to said stem, and a set of incorrect answers to said stem, and wherein said one or more rules comprises a rule that a question instance is formed by combining said stem, one of said correct answers, and a predetermined number of incorrect answers.

3. The method of claim 1, wherein said standard comprises requiring said student to answer every question instance in a set of question instances correctly.

4. The method of claim 1, further comprising:
   if said student's performance does not meet said standard, then providing an explanation relating to a question instance that said student answered incorrectly.

5. The method of claim 1, wherein said limit comprises a maximum number of times that said administering act can be performed.

6. The method of claim 1, wherein said limit comprises a maximum frequency, with respect to time, that said administering act can be performed.

7. A computer-readable medium encoded with information comprising:
   source data from which question instances relating to a subject matter are derivable, said source data comprising a correct solution to a problem;
   one or more rules that govern derivation of said question instances from said source data; wherein each question in said question instances is a multiple-choice question; and
   computer-executable instructions that use said one or more rules to derive question instances from said source data, and that perform acts comprising:
      presenting said problem to a student;
      asking said student to compute said solution based on said problem;
   wherein said solution is not graded;
      administering a first one of a plurality of sets of derived question instances to said student;
      evaluating said student's performance on said first one of said sets of derived question instances; and
      if said student's performance on said first one of said sets of derived question instances does not meet a standard, then recurrently administering one or more additional ones of said sets of derived question instances until said student's performance on one of the additional ones of said sets of derived question instances meets said standard or recurrently administering additional ones of said sets of derived question instances exceeds a limit.

8. The computer-readable medium of claim 7, wherein said source data comprises a stem, a set of correct answers to said stem, and a set of incorrect answers to said stem, and wherein said one or more rules comprises a rule that a question instance is formed by combining said stem, one of said correct answers, and a predetermined number of said incorrect answers.

9. The computer-readable medium of claim 7, wherein said software evaluates said student's performance on the first one of the sets of derived question instances and on the additional ones of the sets of derived question instances, and provides explanations relating to at least those question instances that said student answers incorrectly.

10. The computer-readable medium of claim 7, wherein said standard comprises a requirement that said student answer every question instance in a set of derived question instances correctly.

11. The computer-readable medium of claim 7, wherein said limit comprises a maximum number of times that administration of sets of question instances can recur.

12. The computer-readable medium of claim 7, wherein said limit comprises a maximum frequency, with respect to time, that administration of sets of question instances can recur.

13. The computer-readable medium of claim 7, wherein said computer-executable instructions provides an interface through which a teacher can perform acts comprising any one or more of the following: adding new source data for use by said computer-executable instructions to derive new question instances; changing a standard, wherein said standard measures said student's performance on a set of derived question instances; and changing a limit, wherein said limit governs recurrence on administration of sets of derived question instances.

14. A method of creating a student exercise comprising:
creating base information that comprises or implies a set or range of facts;
presenting said problem to said student;
asking said student to compute said set or range of facts to said problem;
wherein said set or range of facts are not graded;
deriving a first set of question instances that are answerable with knowledge of said set or range of facts; wherein each question in said question instances is a multiple-choice question;
presenting said first set of question instances to said student;
obtaining said student's answers to said first set of question instances;
evaluating said student's performance on said first set of question instances; and
if said student's performance on said first set of question instances does not meet said standard, then performing the following:
deriving a new set of question instances that are answerable with knowledge of said set or range of facts;
performing said presenting, obtaining, and evaluating acts with said new set of question instances in place of said first set of questions, until said student's performance on a new set of question instances meets said standard or performing said presenting, obtaining and evaluating acts exceeds a limit.

15. The method of claim 14, wherein said base information comprises a stem, a set of correct answers to said stem, and a set of incorrect answers to said stem, and wherein said deriving acts are performed by combining said stem, one of said correct answers, and a predetermined number of said incorrect answers.

16. The method of claim 14, wherein said standard comprises a requirement that said student answer correctly every question instance in either said first set of question instances or in one of the new sets of question instances.

17. The method of claim 14, wherein said limit comprises a maximum number of sets of question instances that may be presented to said student.

18. The method of claim 14, wherein said limit comprises a maximum frequency, with respect to time, sets of question instances may be presented to said student.

19. The method of claim 14, further comprising:
providing explanation of answers to said sets of question instances to said student.

20. The method of claim 19, further comprising:
receiving said explanations of said answers as input from an instructor.

21. A computer-readable medium encoded with computer-executable instructions to perform a method of providing an exercise to a student, the method comprising:
deriving a plurality of question instances from a set of source information, said source information comprising or implying a set or range of facts, said questions being answerable with knowledge about said set range of facts;
presenting said problem to said student;
asking said student to compute said set or range of facts based on said problem; wherein said set or range of facts are not graded;
presenting a first set of said plurality of question instances to said student;
wherein each question in said question instances is a multiple-choice question;
receiving said student's answers to said first set of said plurality of question instances; and
if said student's performance on said plurality of question instances does not satisfy a standard, then repeatedly presenting different sets of said plurality of question instances until said student's performance on a presented set satisfies said standard or repeatedly presenting different sets of said plurality of questions instances exceeds a limit.

22. The computer-readable medium of claim 21, wherein said source information comprises a stem, a set of correct answers to said stem, and a set of incorrect answers to said stem, and wherein said question instances comprise said stem, one of said correct answers, and a predetermined number of said incorrect answers.

23. The computer-readable medium of claim 21, wherein said standard comprises a requirement that said student answer all question instances in a set of question instances correctly.

24. The computer-readable medium of claim 21, further comprising:
providing explanations of question instances that said student has answered incorrectly.

25. The computer-readable medium of claim 21, further comprising:
enforcing a limit on the presentation of sets of question instances to students, wherein the limit comprises one or more of the following:
a limit on the number of sets of question instances that may be presented to said student; and
a limit on the frequency, with respect to time, with which sets of question instances may be presented to said student.

26. One or more computer-readable storage media that store data that comprise:
source information relating to a subject matter, the subject matter being described in a teaching tool, the subject matter comprising or implying a set or range of facts about which question instances can be derived;
computer-executable instructions that perform acts comprising:
presenting said problem to said student;
asking said student to compute said set or range of facts based on said problem; wherein said set or range of facts are not graded;
deriving, from said source information, a set of question instances that are answerable with knowledge of said set of facts; wherein each question in said question instances is a multiple-choice question;

presenting said set of question instances to said student;

receiving said student's answers to said set of question instances;

evaluating said student's performance on said set of question instances to determine whether said student's performance meets a standard; and if said student's performance on said set of question instances does not meet said standard, then repeatedly presenting different sets of question instances derived from said source information to said student until said student's performance on a set of question instances meets said standard or repeatedly presenting different sets of question instances derived from said source information to said student exceeds a limit.

27. The one or more computer-readable storage media of claim 26, wherein said source information comprises a stem, a set of correct answers to said stem, and a set of incorrect answers to said stem, and wherein said deriving act comprises combining said stem, one of said correct answers, and a predetermined number of said incorrect answers.

28. The one or more computer-readable storage media of claim 26, wherein said teaching tool comprises a book about said subject matter.

29. The one or more computer-readable storage media of claim 26, wherein said software performs acts further comprising:

imposing a limit on the repeated presentation of different sets of question instances to said student, wherein said limit comprises one or more of the following:

a maximum number of sets of question instances that may be presented to said student; and a maximum frequency, with respect to time, with which different sets of question instances may be presented to said student.

30. The one or more computer-readable storage media of claim 26, wherein said standard comprises a requirement that said student answer every question instance in a set of question instances correctly.

* * * * *